United States Patent
Lakkis

(10) Patent No.: US 8,081,110 B2
(45) Date of Patent: Dec. 20, 2011

(54) ASSOCIATION IN CONTENTION ACCESS PERIOD

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 12/465,428

(22) Filed: May 13, 2009

(65) Prior Publication Data

US 2009/0279525 A1 Nov. 12, 2009

Related U.S. Application Data

(63) Continuation-in-part of application No. 11/960,234, filed on Dec. 19, 2007, now Pat. No. 7,916,081.

(60) Provisional application No. 60/985,957, filed on Nov. 6, 2007.

(51) Int. Cl.
*H04B 7/00* (2006.01)
*H01Q 3/00* (2006.01)

(52) U.S. Cl. .................... 342/367; 342/368

(58) Field of Classification Search .................. 342/367, 342/368
See application file for complete search history.

(56) References Cited

U.S. PATENT DOCUMENTS

| | | | |
|---|---|---|---|
| 7,103,386 B2 | 9/2006 | Hoffmann et al. | |
| 7,505,529 B2 | 3/2009 | Kwak et al. | |
| 7,672,271 B2 | 3/2010 | Lee | |
| 7,675,989 B2 | 3/2010 | Ahn et al. | |
| 2005/0286445 A1 | 12/2005 | Stephens | |
| 2006/0092899 A1* | 5/2006 | Hong et al. | 370/338 |
| 2007/0171933 A1 | 7/2007 | Sammour et al. | |
| 2007/0253345 A1* | 11/2007 | Habetha et al. | 370/254 |
| 2008/0056414 A1 | 3/2008 | Kim et al. | |
| 2008/0076370 A1 | 3/2008 | Kotecha et al. | |
| 2008/0165875 A1 | 7/2008 | Mundarath et al. | |
| 2009/0073954 A1 | 3/2009 | Maltsev et al. | |
| 2009/0122715 A1 | 5/2009 | Lakkis | |
| 2009/0125792 A1 | 5/2009 | Lakkis | |
| 2009/0143008 A1 | 6/2009 | Hottinen et al. | |
| 2009/0207765 A1 | 8/2009 | Yamaura | |

FOREIGN PATENT DOCUMENTS

| | | |
|---|---|---|
| EP | 1659813 A1 | 5/2006 |
| EP | 1816758 A2 | 8/2007 |
| WO | WO2007096821 | 8/2007 |

OTHER PUBLICATIONS

Budisin, S.Z., "Efficient pulse compressor for Golay complementary sequences," Electronic Letters, 27, No. 3, pp. 219-220, Jan. 31, 1991.
Domenico Antonio Fittipaldi et al: "IEEE 802.15.3C Medium Access Controller Throughout for Phased Array Systems" IEEE International Symposium on Personal Indoor and Mobile Radio Communications. PIMRC, IEEE; PI, XX, Sep. 1, 2007, pp. 1-5, XP031168545.

(Continued)

*Primary Examiner* — Harry K Liu
(74) *Attorney, Agent, or Firm* — Dang M. Vo

(57) ABSTRACT

Certain aspects of the present disclosure relate to a method for association in contention access periods and to a method for multi-cycle training in channel time allocation periods.

79 Claims, 13 Drawing Sheets

OTHER PUBLICATIONS

Fumihide Kojima et al: "Necessary Modificaitons on Conventional IEEE802.15.3b MAC to Achieve IEEE802.15.3c Millimeter Wave WPAN" IEEE International Symposium on Personal, Indoor and Mobile Radio Communications. PIMRC, IEEE; PI. XX, Sep. 1, 2007, pp. 1-5, XP031168693.

Guangqi Yang et al.: "Design of Synchoronization Sequences in a MIMO Demonstration System" Wireless Communications and Applied Computational Electromagnetics, 20 05. IEEE/ACES International Conference on Honolulu, HI Apr. 3-7, 2005, Piscataway, NJ, USA, IEEE, Apr. 3, 2005, pp. 40-43, XP010826457.

IEEE 802.11n/D1.0, "Part 11: Wireless LAN Medium Access Control (MAC) and Physical Layer (PHY) specifications: Enhancements for Higher Throughput," IEEE, Mar. 2006.

IEEE 802,16e/D12, Part 16: Air interface for Fixed and Mobile Broadband Wireless.

Access Systems—Amendment for Physical and Medium Access Control Layers for Combined Fixed and Mobile Operation in Licensed Bands, IEEE, Oct. 2005.

International Search Report—PCT/US08/082698, International Search Authority—European Patent Office—Feb. 16, 2009.

International Search Report—PCT/US08/082698, International Search Authority—European Patent Office—Feb. 16, 2009.

International Search Report—PCT/US08/087094, International Search Authority—European Patent Office—Apr. 21, 2009.

Jechoux B et al; "Concatenated extended complemetary sequences for inter-base station synchronization in UMTS TDD mode" VTC Fall 2001. IEEE 54th. Vehiclar Technology Conference. Proceedings. Atlantic City, NJ, Oct. 7-11, 2001; [IEEE Vehicular Technology Conference], New York, NY:IEEE, US, vol. 3, Oct. 7, 2001, pp. 1691-1695, XP010562252.

Lakkis, I. et al., "A simple coherent GMSK demodulator," Personal, Indoor and Mobile Radio Communications, 2001 12th IEEE International Symposium on, vol. 1, No. pp. A-112-A-114 vol. 1, Sep. 2001.

Lakkis I. et al: "IEEE 802.15/0760-03-003c mmWave OFDM Physical Layer Proposal" IEEE 802.15 TG3C, Sep. 19, 2007, pp. 1-75, XP002507726.

Love et al: "Grassmannian beamforming for multiple-input multiple-output wireless systems" IEEE Transactions on Information Theory, IEEE, US, vol. 49, No. 10, Oct. 1, 2003, XP011102252.

Nortel Networks: "Clarifications on Golay-Hadamard Sequence Based RACH Preamble" 3GPP Draft; R1-99C28, 3rd Generation Partnership Project (3GPP), Mobile Competence Centre; 650, Route Des Lucioles; F-06921 Sophia-Anitpolis Cedex; France, vol.tsg_ranWG1_RL1/TSGR1_07/Docs/Pdfs, No. Hannover; 19990830, Aug. 26, 1999, XP050089422.

Penfei Xia et al: "Short Range Gigabit Wireless Communications Systems: Potentials, Challenges and Techniques" Ultra-Wideband, 2007. ICUWB 2007. IEEE International Conference on, IEEE, PI, Sep. 1, 2007, pp. 123-128, XP031159333.

Wang H M et al: "Efficient MIMO channel estimation using complementary sequences," Communications, IET, vol. 1, No. 5, Oct. 4, 2007, pp. 962-969, XP006029714.

Written Opinion—PCT/US08/082695, International Search Authority—European Patent Office—Feb. 9, 2009.

Written Opinion—PCT/US08/082698, International Search Authority—European Patent Office—Feb. 16, 2009.

Written Opinion—PCT/US08/087094, International Search Authority—European Patent Office—Apr. 21, 2009.

* cited by examiner

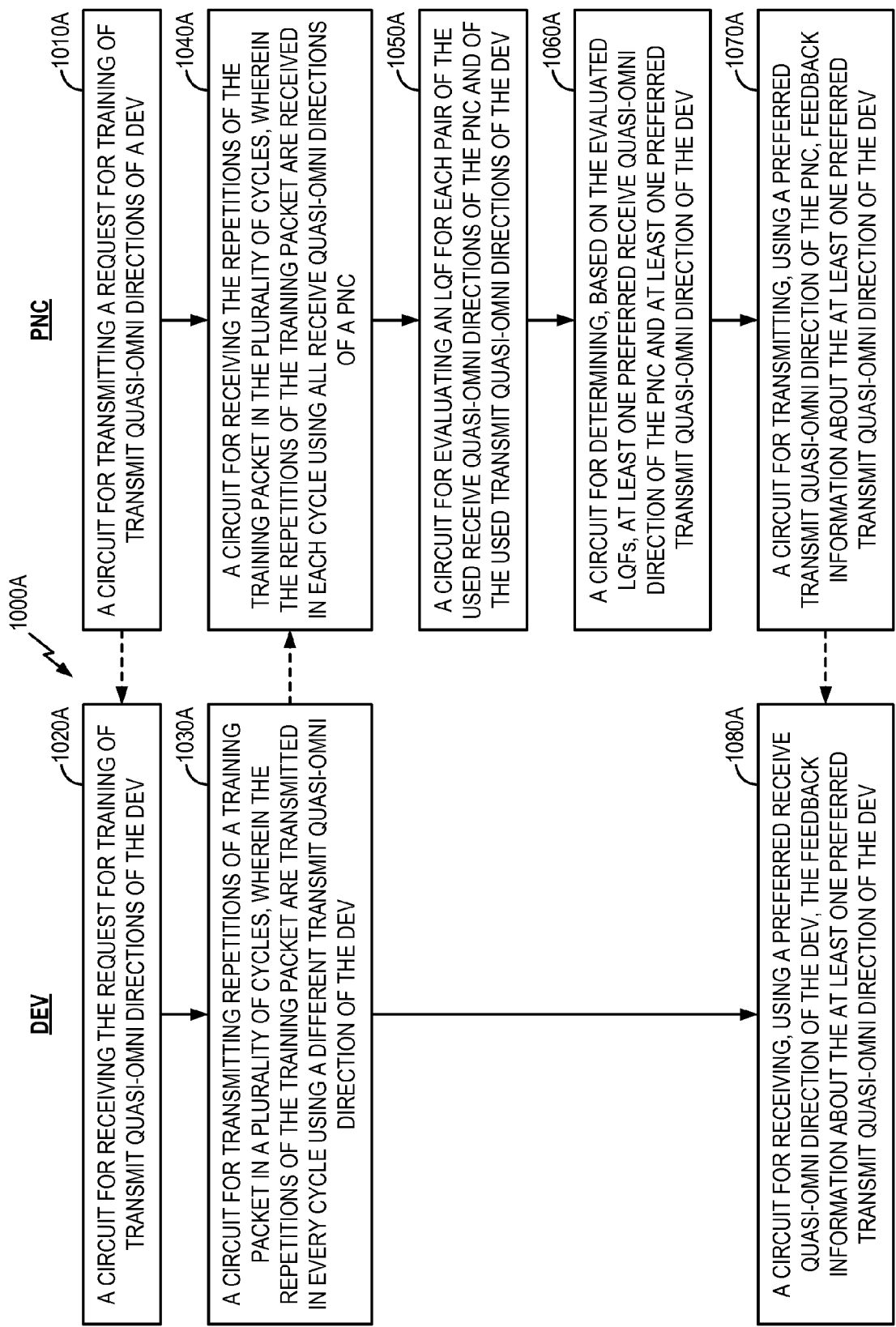

ASSOCIATION IN CONTENTION ACCESS PERIOD

CLAIM OF PRIORITY UNDER 35 U.S.C. §120

The present Application for Patent is a continuation-in-part of patent application Ser. No. 11/960,234, entitled "BEAMFORMING IN MIMO SYSTEMS" filed Dec. 19, 2007, now U.S. Pat. No. 7,916,081 which claims priority to Provisional Application No. 60/985,957, entitled "OFDM PREAMBLES FOR BEAMFORMING AND DATA PACKETS" filed Nov. 6, 2007, and assigned to the assignee hereof and hereby expressly incorporated by reference herein.

CROSS REFERENCE TO RELATED APPLICATIONS

The present Application is related by subject matter to U.S. patent application Ser. No. 12/465,511, entitled "QUASI-OMNI TRAINING IN CHANNEL TIME ALLOCATION PERIOD" filed May 13, 2009, and assigned to the assignee hereof and hereby expressly incorporated by reference herein.

BACKGROUND

1. Field

Certain aspects of the present disclosure generally relate to a wireless communication and, more particularly, to a method for association in a contention access period and to a method for multi-cycle training in a channel time allocation period.

2. Background

A device in communication systems, such as a piconet wireless network, searches for a direction of a piconet controller (PNC) during an association procedure. The device is considered not to be omni-capable on reception, and multiple receive directions can be supported. Therefore, there is a need in the art for a method to provide efficient directional association with the PNC.

Furthermore, antenna directions of the device and of the PNC found during the association may not be best possible due to possible collisions in a contention access period. Therefore, there is a need in the art for a method to support training and tracking of antenna directions following the association procedure.

SUMMARY

Certain aspects provide a method for wireless communications. The method generally includes transmitting, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame, and receiving, at the device, an association response command transmitted from the PNC.

Certain aspects provide an apparatus for wireless communications. The apparatus generally includes a transmitter configured to transmit, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame, and a receiver configured to receive, at the device, an association response command transmitted from the PNC.

Certain aspects provide an apparatus for wireless communications. The apparatus generally includes means for transmitting, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame, and means for receiving, at the device, an association response command transmitted from the PNC.

Certain aspects provide a computer-program product for wireless communications. The computer-program product includes a computer-readable medium comprising instructions executable to transmit, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame, and receive, at the device, an association response command transmitted from the PNC.

Certain aspects provide an access terminal. The access terminal generally includes at least one antenna, a transmitter configured to transmit, from the access terminal via the at least one antenna, an association request command one or more times during at least one association sub contention access period (S-CAP) in at least one super-frame using at least one transmit quasi-omni direction of the access terminal, wherein an access point is set for reception on different receive quasi-omni direction during each association S-CAP in a super-frame of the at least one super-frame, and a receiver configured to receive, at the access terminal via the at least one antenna, an association response command transmitted from the access terminal.

Certain aspects provide a method for wireless communications. The method generally includes receiving, at a piconet controller (PNC), an association request command one or more times during an association sub contention access period (S-CAP), wherein one of a plurality of receive quasi-omni directions of the PNC is used for the reception, the association request command is transmitted from a device during at least one association S-CAP in at least one super-frame, and the PNC is set for reception on different receive quasi-omni direction during each association S-CAP in a super-frame of the at least one super-frame, and transmitting, from the PNC, an association response command to the device using a preferred transmit quasi-omni direction of the PNC, wherein information about the preferred transmit quasi-omni direction is included in the received association request command.

Certain aspects provide an apparatus for wireless communications. The apparatus generally includes a receiver configured to receive, at a piconet controller (PNC), an association request command one or more times during an association sub contention access period (S-CAP), wherein one of a plurality of receive quasi-omni directions of the PNC is used for the reception, the association request command is transmitted from a device during at least one association S-CAP in at least one super-frame, and the PNC is set for reception on different receive quasi-omni direction during each association S-CAP in a super-frame of the at least one super-frame, and a transmitter configured to transmit, from the PNC, an association response command to the device using a preferred transmit quasi-omni direction of the PNC, wherein information about the preferred transmit quasi-omni direction is included in the received association request command.

Certain aspects provide an apparatus for wireless communications. The apparatus generally includes means for receiving, at a piconet controller (PNC), an association request command one or more times during an association sub contention access period (S-CAP), wherein one of a plurality of receive quasi-omni directions of the PNC is used for the reception, the association request command is transmitted from a device during at least one association S-CAP in at least one super-frame, and the PNC is set for reception on different receive quasi-omni direction during each association S-CAP in a super-frame of the at least one super-frame, and means for transmitting, from the PNC, an association response command to the device using a preferred transmit quasi-omni direction of the PNC, wherein information about the preferred transmit quasi-omni direction is included in the received association request command.

Certain aspects provide a computer-program product for wireless communications. The computer-program product includes a computer-readable medium comprising instructions executable to receive, at a piconet controller (PNC), an association request command one or more times during an association sub contention access period (S-CAP), wherein one of a plurality of receive quasi-omni directions of the PNC is used for the reception, the association request command is transmitted from a device during at least one association S-CAP in at least one super-frame, and the PNC is set for reception on different receive quasi-omni direction during each association S-CAP in a super-frame of the at least one super-frame, and transmit, from the PNC, an association response command to the device using a preferred transmit quasi-omni direction of the PNC, wherein information about the preferred transmit quasi-omni direction is included in the received association request command.

Certain aspects provide an access point. The access point generally includes at least one antenna, a receiver configured to receive, at the access point via the at least one antenna, an association request command one or more times during an association sub contention access period (S-CAP), wherein one of a plurality of receive quasi-omni directions of the access point is used for the reception, the association request command is transmitted from an access terminal during at least one association S-CAP in at least one super-frame, and the access point is set for reception on different receive quasi-omni direction during each association S-CAP in a super-frame of the at least one super-frame, and a transmitter configured to transmit, from the access point via the at least one antenna, an association response command to the access terminal using a preferred transmit quasi-omni direction of the access point, wherein information about the preferred transmit quasi-omni direction is included in the received association request command.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10A illustrates example components capable of performing the operations illustrated in FIG. 10.

DETAILED DESCRIPTION

Figure 1:
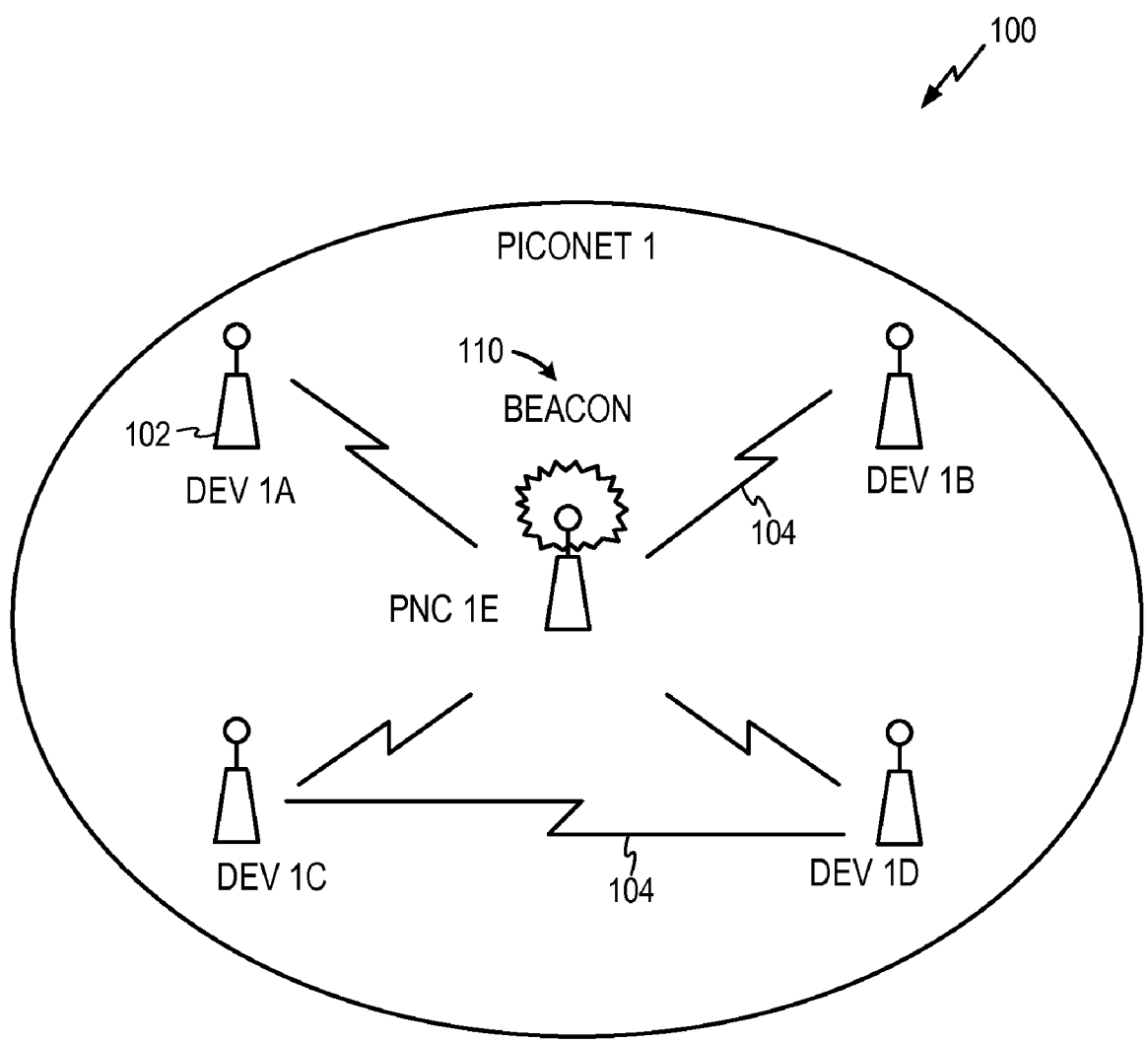
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

In the following detailed description, various aspects of the disclosure may be described in the context of a wireless network or "piconet" in accordance to the IEEE 802.15 family of standards (whether adopted or proposed). While these disclosed aspects may be well suited for use with such networks in which an access point (AP) may serve as a piconet coordinator (PNC), those skilled in the art will readily appreciate that these disclosed aspects are likewise applicable for use in various other communication environments utilizing any type of access points (APs) and access terminals (ATs), including, but not limited to, networks in accordance with the IEEE 802.11 family of standards and may, in fact, allow networks in accordance with different standards to better co-exist. Accordingly, any reference to an IEEE 802.15 compliant network is intended only to illustrate the disclosed aspects, with the understanding that such disclosed aspects have a wide range of applications.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

In some aspects, the node is a wireless node. Such wireless nodes may provide, for example, connectivity for or to a network (e.g., a personal area network or piconet, wide area network such as the Internet, or a cellular network) via a wired or wireless communication link.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

FIG. 1 illustrates an example of a wireless communication system 100 (i.e., a Piconet 1) in which aspects of the present disclosure may be employed. As illustrated, Piconet 1 may include a number of wireless devices 102 or "terminals" 1A-1E that can communicate with one another using relatively short-range wireless links 104. In the illustrated example, terminal 1E acts as a PNC for Piconet 1. Although illustrated with five devices, it should be appreciated that any number of devices (i.e., two or more) may form a wireless personal area network.

Each of the terminals 102 in the Piconet 1 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others.

The devices in the Piconet 1 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/ CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short-range network. In another possible configuration, a wireless personal area network may be formed between various audio/ visual devices in, for example, a user's living room. In yet another configuration, a user's laptop computer may communicate with terminals associated with other users in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 1.2, Bluetooth SIG, Inc., November 2003), the IEEE 802.15 standards, etc.). The IEEE 802.15.3c standard, for example, is a high data rate wireless personal area network standard. In accordance with the IEEE 802.15.3c standard, one of the terminals within a piconet is selected as a Piconet Coordinator (PNC) to coordinate the operation of the network. For example, with reference to FIG. 1, the device PNC 1E represents a PNC for the Piconet 1 in an IEEE 802.15.3c implementation.

As illustrated, PNC 1E may transmit a beacon signal 110 (or simply "beacon") to other devices of Piconet 1, which may help the other terminals within Piconet 1 synchronize their timing with PNC 1E. Thus, the beacon, typically sent at the beginning of every super-frame, contains information that may be used to time-synchronize the terminals in the piconet. Each terminal in the piconet, including the PNC, may reset its super-frame clock to zero at the beginning of the beacon preamble. If a terminal does not hear a beacon, it may reset its super-frame clock to zero at the instant where it expected to hear the beginning of the beacon preamble (e.g., based on previous super-frame timing).

Figure 2:
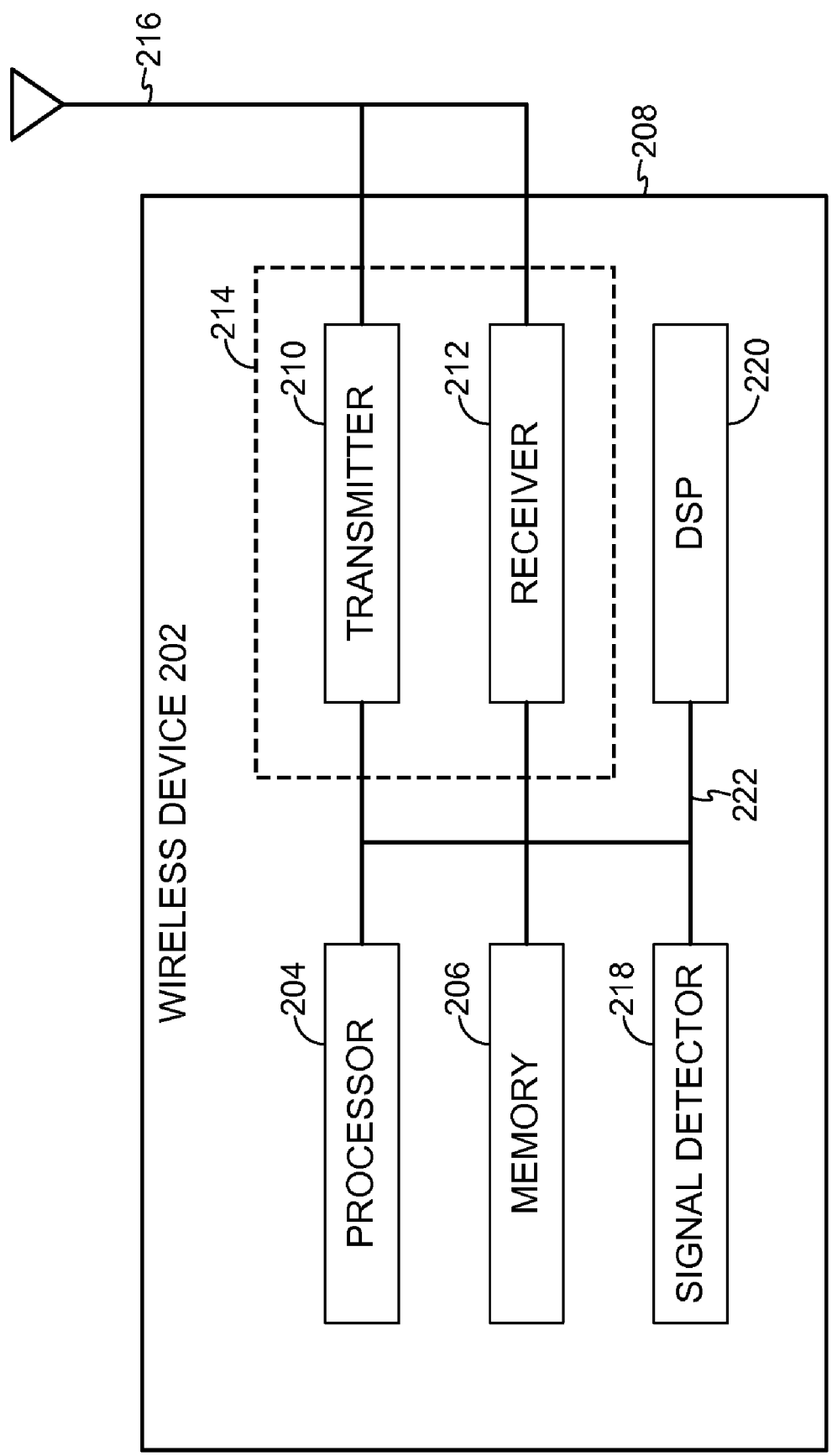
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be the PNC 1E or a terminal 102 in the Piconet 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
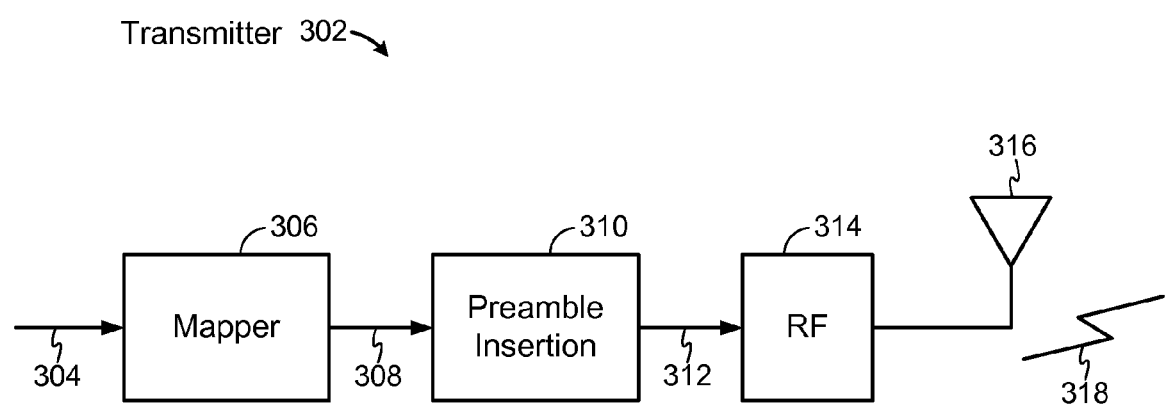
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes single-carrier or some other transmission technique. Portions of the transmitter 302 may be implemented in the transmitter 210 of a wireless device 202. The transmitter 302 may be implemented in the PNC 1E for transmitting data 304 to a terminal 102. The transmitter 302 may also be implemented in a terminal 102 for transmitting data 304 to the PNC 1E.

Data 304 to be transmitted are shown being provided as input to a mapper 306. The mapper 306 may map the data stream 304 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 306 may output a symbol stream 308, which may represents an input into a preamble insertion unit 310.

The preamble insertion unit 310 may be configured for inserting a preamble sequence at the beginning of the input symbol stream 308, and generates a corresponding data stream 312. The preamble may be known at the receiver and may be utilized for time and frequency synchronization, channel estimation, equalization and channel decoding. The output 312 of the preamble insertion unit 310 may then be up-converted to a desired transmit frequency band by a radio frequency (RF) front end 314. An antenna 316 may then transmit a resulting signal 318 over a wireless channel.

Figure 4:
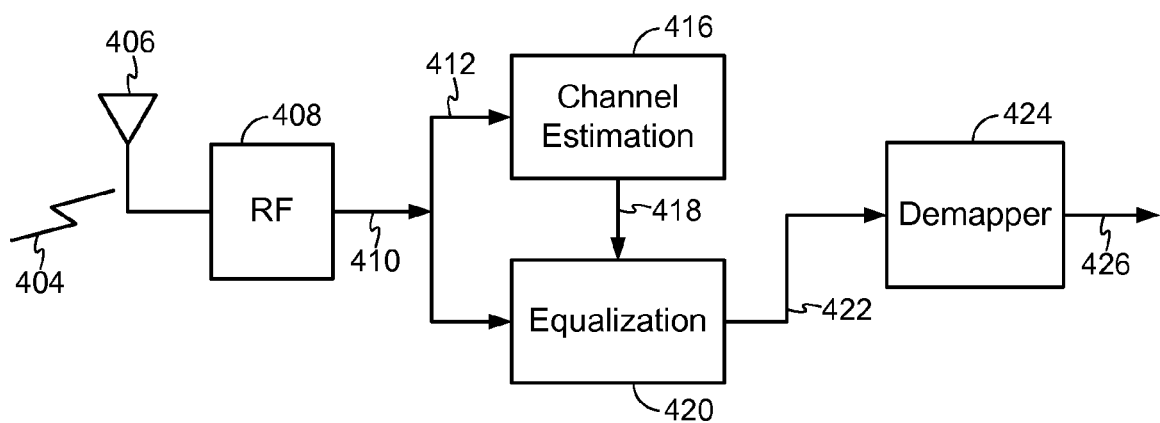
FIG. 4 illustrates an example receiver that may be used within a wireless communication system in accordance with certain aspects of the present disclosure.

FIG. 4 illustrates an example of a receiver 402 that may be used within a wireless device 202 that utilizes a single-carrier or some other transmission technique. Portions of the receiver 402 may be implemented in the receiver 212 of a wireless device 202. The receiver 402 may be implemented in a terminal 102 for receiving data 404 from the PNC 1E. The receiver 402 may also be implemented in the PNC 1E for receiving data 404 from a terminal 102.

When a signal 404 is received by an antenna 406, it may be down-converted to a baseband signal 410 by an RF front end 408. A frame format of the received signal for single-carrier data communications typically comprises a preamble followed by a data portion. A portion of the preamble 412 may be used for channel estimation by unit 416. Received data 414 may be processed by an equalization unit 420 employing previously computed channel estimates 418.

A demapper 424 may input an equalized data stream 422 and may perform the inverse of the symbol mapping operation that was performed by the mapper 306 from FIG. 3 thereby outputting a data stream 426. Ideally, this data stream 426 corresponds to the data 304 that was provided as input to the transmitter 302, as illustrated in FIG. 3.

Beamforming Terminology

When describing beamforming between two devices, the following notation can be used. Two devices that are communicating can be referred to as DEV1 and DEV2, for example, DEV1 may be a piconet controller (PNC) from FIG. 1 and DEV2 may be a subscriber station. The device numbered can be d for DEV1 and 2 for DEV2.

Figure 5:
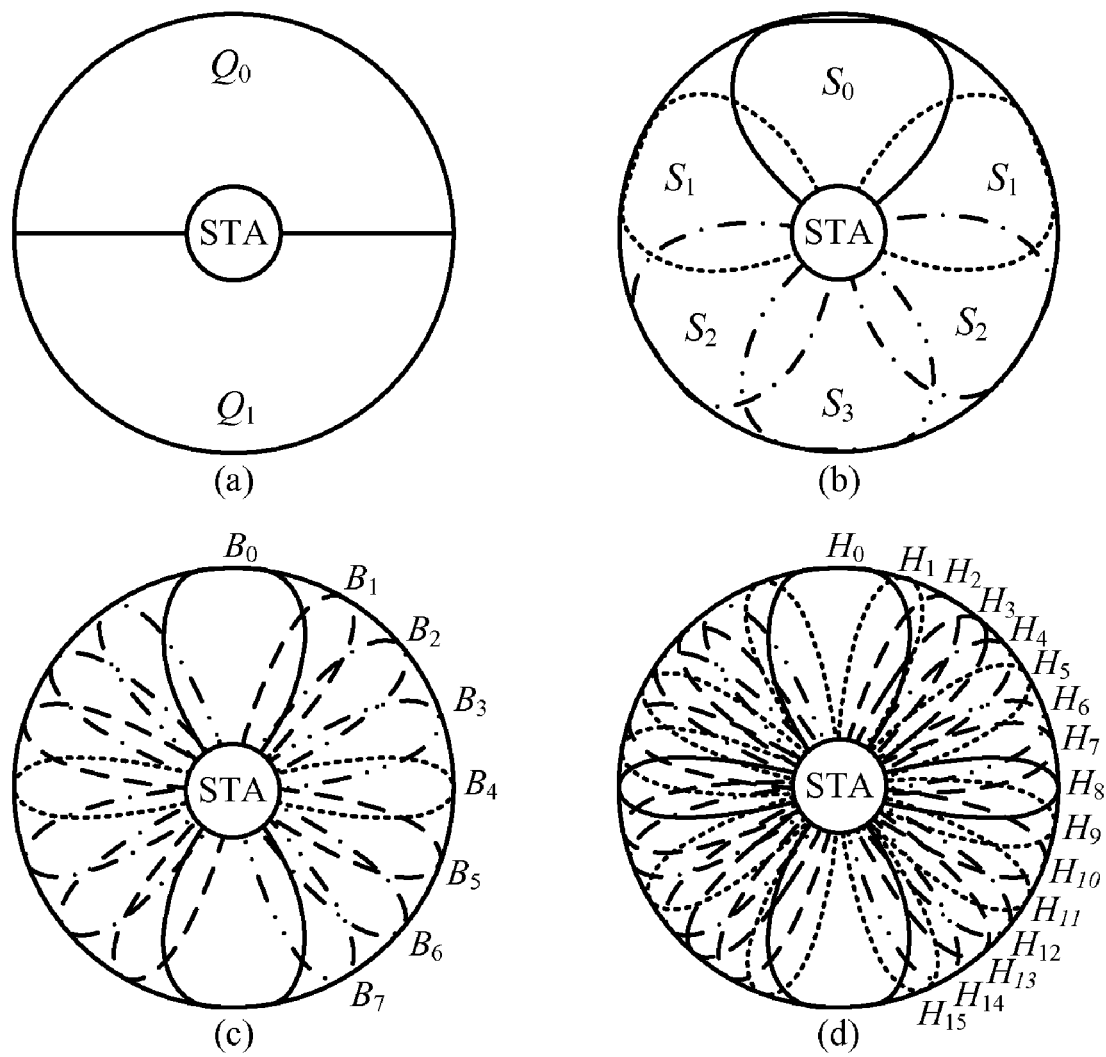
FIG. 5 illustrates a beamforming terminology in accordance with certain aspects of the present disclosure.

The term quasi-omni pattern generally relates to the lowest resolution pattern that covers a very broad area of a region of space of interest around a device (DEV). A PNC may cover the region of space of interest with a minimal set of, possibly overlapping, quasi-omni patterns. A set size equal to one may indicate that the PNC is able to cover the spatial region of interest with only one quasi-omni pattern, indicating that the PNC is omni-capable. The total number of quasi-omni transmit and receive patterns of interest for DEV number d can be denoted as $I^{(d,t)}$ and $I^{(d,r)}$, respectively. The corresponding quasi-omni transmit and receive patterns can be denoted as $Q_n^{(d,t)}$ where n=0, 1, . . . , $I^{(d,t)}$−1 for the transmit patterns and $Q_n^{(d,r)}$ where n=0, 1, . . . , $I^{(d,r)}$−1 for the receive patterns. The preferred pair of quasi-omni transmit and receive patterns for DEV d when communicating with the other DEV can be identified by indices $i^{(d,t)}$ and $i^{(d,r)}$, respectively. The corresponding quasi-omni transmit and receive patterns can be denoted as $Q_{i^{(d,t)}}^{(d,t)}$ and $Q_{i^{(d,r)}}^{(d,r)}$, respectively. If both devices are SAS devices, the superscripts t and r can be omitted since same antenna arrays are utilized for both transmission and reception. FIG. 5A illustrates example of two quasi-omni patterns $Q_0$ and $Q_1$ for the SAS device.

As used herein, the term sector generally refers to a second level resolution pattern that covers a relatively broad area of multiple beams. A sector can cover a set of consecutive or nonconsecutive beams and different sectors can overlap. The total number of transmit and receive sectors of interest for DEV number d can be denoted as $J^{(d,t)}$ and $J^{(d,r)}$, respectively. The corresponding transmit and receive sectors can be denoted as $S_n^{(d,t)}$ where n=0, 1, . . . , $J^{(d,t)}$−1 for the transmit sectors, and $S_n^{(d,r)}$ where n=0, 1, . . . , $J^{(d,r)}$−1 for the receive sectors. The preferred pair of transmit and receive sectors for DEV d when communicating with the other DEV can be identified by indices $j^{(d,t)}$ and $j^{(d,r)}$ respectively. The corresponding transmit and receive sectors can be denoted as $S_j^{(d,t)}$ and $S_j^{(d,r)}$, respectively. If both devices are SAS devices, the superscripts t and r can be omitted. FIG. 5B illustrates example of four overlapping sectors $S_0$, $S_1$, $S_2$, $S_3$ for the SAS device.

Sectors can be divided into beams as a higher level resolution pattern. The total number of transmit and receive beams of interest for DEV number d can be denoted as $K^{(d,t)}$ and $K^{(d,r)}$, respectively. The corresponding transmit and receive beams can be denoted as $B_n^{(d,t)}$ where n=0, 1, ..., $K^{(d,t)}$–1 for the transmit beams, and $B_n^{(d,r)}$ where n=0, 1, ..., $K^{(d,r)}$–1 for the receive beams. The preferred pair of transmit and receive beams for DEV d when communicating with the other DEV can be identified by indices $k^{(d,t)}$ and $k^{(d,r)}$, respectively. The corresponding transmit and receive beams can be denoted as $B_{k^{(d,t)}}^{(d,t)}$ and $B_{k^{(d,r)}}^{(d,r)}$, respectively. If both devices are SAS devices, the superscripts t and r can be omitted. FIG. 5C illustrates an example of an 8-element linear antenna array with eight beams $B_0$, $B_1$, ..., $B_7$ for the SAS device.

Beams can be further divided into high-resolution (HRS) beams as the highest level of resolution pattern. The total number of transmit and receive HRS beams of interest for DEV numbered can be denoted as $L^{(d,t)}$ and $L^{(d,r)}$, respectively. The corresponding transmit and receive HRS beams can be denoted as $H_n^{(d,t)}$ where n=0:$L^{(d,t)}$–1 for the transmit HRS beams, and $H_n^{(d,r)}$ where n=0: $L^{(d,r)}$–1 for the receive HRS beams. The preferred pair of transmit and receive HRS beams for DEV d when communicating with the other DEV can be identified by indices $l^{(d,t)}$ and $l^{(d,r)}$, respectively. The corresponding transmit and receive HRS beams can be denoted as $H_{l^{(d,t)}}^{(d,t)}$ and $H_{l^{(d,r)}}^{(d,r)}$, respectively. If both devices are SAS devices, the superscripts t and r can be omitted. FIG. 5D illustrates an example of an 8-element linear antenna array with 16 HRS beams $H_0$, $H_1$, ..., $H_{15}$ for the SAS device.

In general, the multi-resolution definition of quasi-omni patterns, sectors, beams and HRS beams becomes a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

Supperframe Support for Directional Devices

Figure 6:
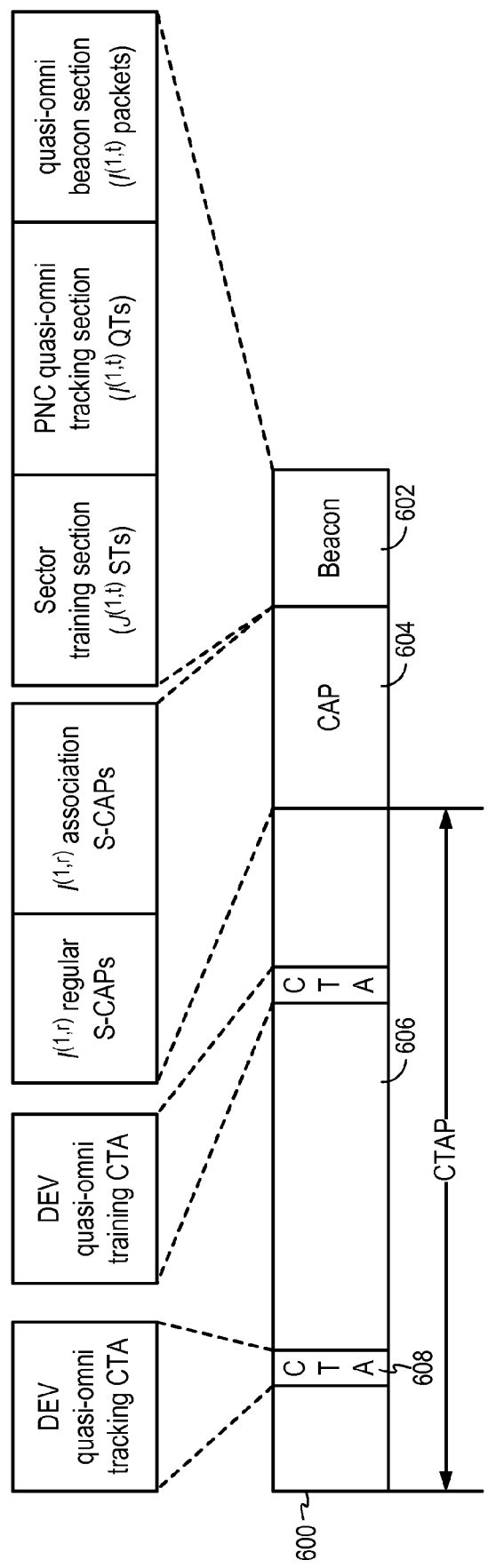
FIG. 6 illustrates a super-frame structure for quasi-omni capable devices in accordance with certain aspects of the present disclosure.

FIG. 6 illustrates a super-frame structure for quasi-omni capable devices in accordance with certain aspects of the present disclosure. The super-frame 600 may comprise beacon portion 602, a contention access period (CAP) 604, and a channel time allocation period (CTAP) 606. The CTAP 606 may comprise multiple channel time allocations (CTAs) 608.

The beacon portion 602 may be used for quasi-omni coverage in the region of space of interest, to enable devices (DEVs) to track quasi-omni directions of a PNC, and for a sector-level training between a DEV and the PNC (i.e., for a pro-active beamforming). The CAP 604 may be used for association of the DEV with the PNC, and CTA 608 within the CTAP 606 may be used for training and tracking of DEV quasi-omni transmit direction.

Directional Contention Access Period

Figure 7:
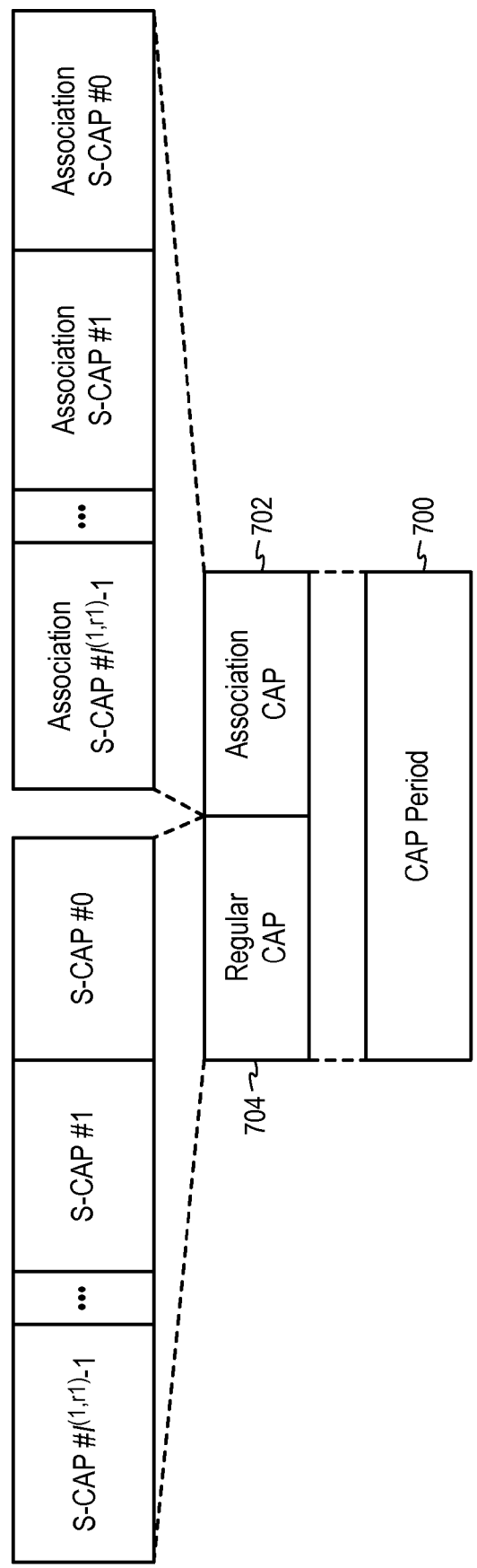
FIG. 7 illustrates a structure of a contention access period (CAP) in accordance with certain aspects of the present disclosure.

The CAP period 700 may be divided into two sections, an association section 702 and a regular CAP section 704, as illustrated in FIG. 7. If a PNC allows new association requests, then an association section may exist at the CAP period. The association section 702 may be further divided into a set of $I^{(1,r_1)}$ equal size association sub CAPs (i.e., S-CAPs, as illustrated in FIG. 7) corresponding to some of the $I^{(1,r)}$ different quasi-omni receive directions of the PNC within one super-frame or distributed over multiple super-frames (i.e., $r_1 \leq r$).

The regular CAP section 704 may be equally divided into the $I^{(1,r_1)}$ equal size sub CAPs (i.e., S-CAPs, as illustrated in FIG. 7) corresponding to some of the $I^{(1,r)}$ different quasi-omni receive directions of the PNC within one super-frame or distributed over multiple super-frames. Each S-CAP may be received by the PNC using a different antenna receive direction.

The association section CAP 702 may be utilized solely for devices to send association request commands to the PNC. On the other hand, the regular CAP 704 may be used for all other commands and data exchanges.

If an asymmetric antenna system (AAS) field in a piconet synchronization parameters field is set to zero, indicating that the PNC represents a symmetric antenna system (SAS), then the number of S-CAPs may correspond one-to-one with the number of beacons ($I^{(t,r)}=I^{(1,r)}$). That is, the transmit direction of the PNC used for the $i^{th}$ (i=0, 1, 2, ..., $I^{(1,r)}$–1) beacon frame transmission may be used for the $i^{th}$ S-CAP.

On the other hand, if the AAS field in the piconet synchronization parameters field is set to one, indicating that the PNC is AAS, the number of S-CAPs may be equal to $I^{(1,r)}$, which is specified in a beacon offset Information Element (IE). The special case where $I^{(1,r)}=1$ indicates that the PNC may be omni capable on reception.

If two peer DEVs do not know antenna directions to point to each other, then the two DEVs may perform beamforming before starting to communicate in the regular CAP. In order to support directional peer communication in the regular CAP, the source DEV may send to the PNC an announce command with directional peer IE with a request/release bit set to one. If the PNC can allow the directional peer communication, then the PNC may include the directional peer IE in the beacon in order to announce that the two devices may use the regular CAP for directional peer communication.

After the source and destination DEVs receive from the PNC the directional peer IE within the beacon, then the two DEVs may switch their antenna directions and communicate with each other in the regular CAP. After the two devices complete directional peer communication, the source device may send to the PNC an announce command with directional peer IE with the request/release bit set to zero, and the PNC may remove directional peer IE from its beacon.

Directional Association

A DEV that is not omni capable on reception and supports multiple receive directions may employ directional association. Let $I^{(1,t)}$ and $I^{(1,r)}$ be the number of PNC quasi-omni transmit and receive directions, respectively, and let $I^{(2,t)}$ and $I^{(2,r)}$ be the number of DEV quasi-omni transmit and receive directions, respectively. The DEV may want to find a PNC and to associate with that PNC.

The preferred and second preferred pair of PNC transmit and DEV receive directions or DEV transmit and PNC receive directions can be referred as the preferred antenna direction pair and second preferred antenna direction pair, respectively. While searching for the PNC, the DEV may listen to quasi-omni beacons at all $I^{(2,r)}$ quasi-omni receive directions in order to find the preferred and second preferred antenna direction pairs based on a link quality information (LQI) measurement. The DEV may use the preferred DEV quasi-omni receive direction to receive further transmissions from the PNC when quasi-omni transmission is employed. The DEV may include the information of the preferred PNC quasi-omni transmit direction in its association request commands to inform the PNC about the preferred PNC quasi-omni transmit direction for further quasi-omni transmissions to the DEV.

The DEV may track, based on LQI measurement, the preferred and second preferred antenna direction pairs during the quasi-omni beacon section and the PNC quasi-omni tracking section of beacons. If the beacon quality in the second preferred antenna direction pair is better than the preferred antenna direction pair, then the PNC and the DEV may switch to the second preferred antenna direction pair, which may become the new preferred antenna direction pair.

The association procedure of the DEV may depend on the antenna types at both the PNC and the DEV. The DEV may transmit one or multiple association request commands. If both the DEV itself and the PNC utilize SAS antennas, the association request command may be transmitted on the DEV antenna quasi-omni direction $I^{(2,t)}=I^{(2,r)}$ during the S-CAP with index $I^{(1,t)}$. The transmission may also obey the rules for contention access.

Figure 8:
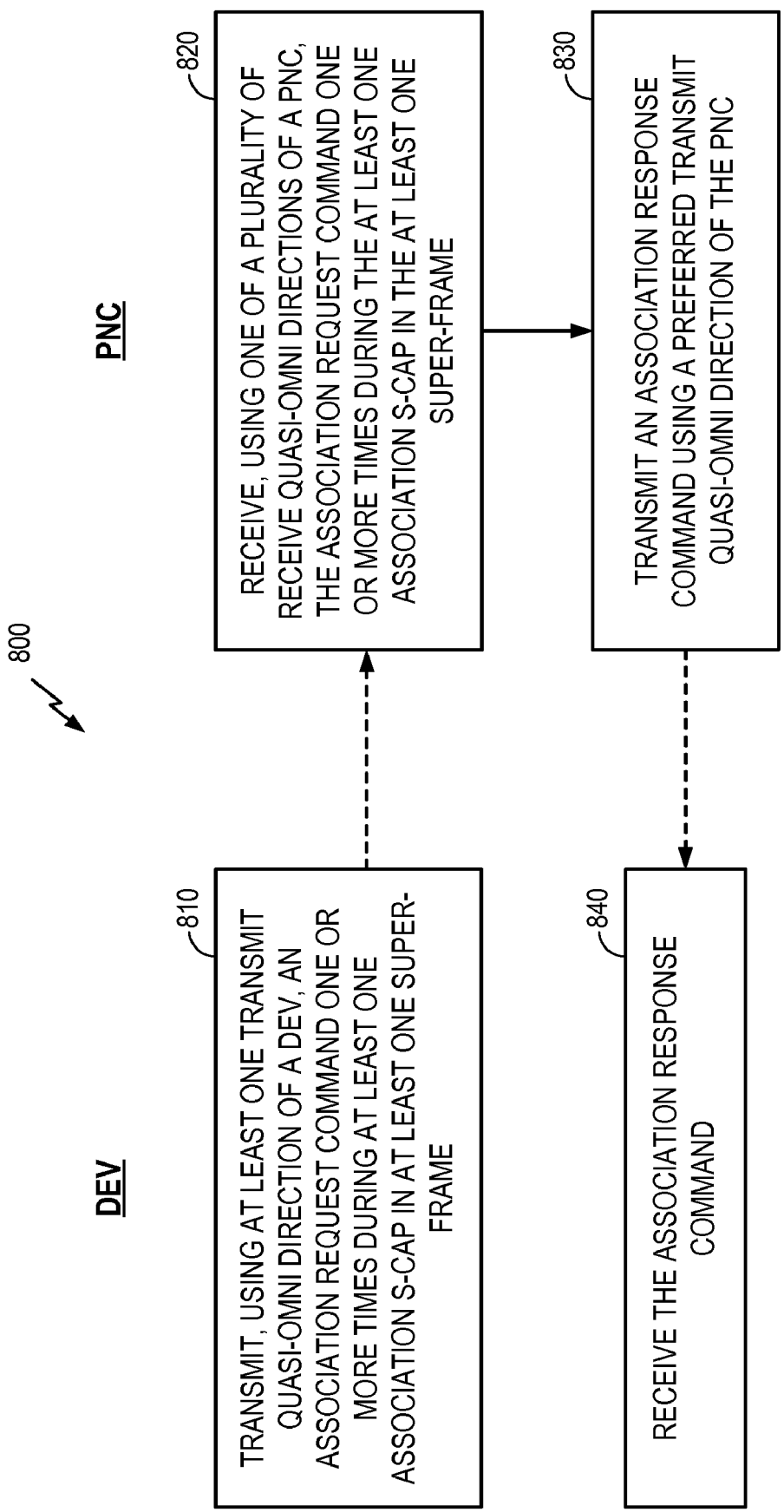
FIG. 8 illustrates example operations for directional association in accordance with certain aspects of the present disclosure.

FIG. 8 illustrates example operations 800 for directional association in the case of asymmetric antenna system (AAS) in accordance with certain aspects of the present disclosure. If either the DEV or the PNC is AAS, the DEV may not know which quasi-omni transmit direction to use, nor which S-CAP is the preferred one. In this case, the DEV may transmit, at 810, the association request command at different antenna direction pairs during association S-CAPs in one or multiple super-frames until the DEV receives an association response command successfully or association timeout occurs. The PNC may be set for reception on different receive quasi-omni direction during each association S-CAP within a super-frame. The number of association S-CAPs within the super-frame may correspond to a number of different receive quasi-omni directions of the PNC.

At 820, the PNC may receive in an association S-CAP using one of a plurality of receive quasi-omni direction of the PNC, the association request command one or more times transmitted from the DEV during association S-CAPs in one or multiple super-frames. At 830, the PNC may transmit the association response command to the DEV using a preferred transmit quasi-omni direction of the PNC, wherein information about the preferred transmit quasi-omni direction may be included in the received association request command. The DEV may successfully receive, at 840, the association response command transmitted from the PNC. The association response command may include the information of the antenna direction from which the PNC received the association request command.

In one aspect of the present disclosure, the association request command may be transmitted at least two times back-to-back during one association S-CAP. Each association request command may be transmitted using a different transmit quasi-omni direction of the DEV. Each transmitted association request command may be associated with a counter indicating how many repetitions are remaining for transmission during the association S-CAP, i.e., the counter may comprise a total number of association request commands in the association S-CAP and identification (ID) of the currently transmitted association request command.

The PNC may decode all association request commands received during the S-CAP in order to obtain information indicating quasi-omni transmit directions of the DEV used for transmitting these copies of the association request command. A link quality factor (LQF) may be evaluated at the PNC for each received association request command, and a preferred transmit quasi-omni direction of the DEV may be determined as a direction with the largest LQF among the evaluated LQFs. A link quality factor may be evaluated by measuring a signal-to-noise ratio (SNR), or a signal-to-noise plus interference ratio (SNIR), or a bit error rate (BER), or a receive signal strength indicator (RSSI), or any combination thereof.

In another aspect of the present disclosure, only one association request command may be transmitted during an association S-CAP using a transmit quasi-omni direction of the DEV. Then, the DEV may listen for an association response command from the PNC during an immediate acknowledgement period of the super-frame. If the DEV does not hear the association response command, then the DEV may again transmit the association request command in another association S-CAP using another quasi-omni direction of the DEV. This may be repeated until the DEV receives the association response command from the PNC.

After receiving the transmitted association request command, the PNC may decode it to obtain information indicating a quasi-omni transmit direction of the DEV used for transmitting this particular command. Then, that quasi-omni transmit direction may become a preferred transmit quasi-omni direction of the DEV, for example if a corresponding evaluated LQF has a value equal to or greater than a defined value. After that, the PNC may transmit the association response command or an Immediate Acknowledgement (1 mm-ACK) to the DEV, and may stop listening for other repetitions of the association request command transmitted in other association S-CAPs. Alternatively, the PNC may not transmit the association response command and may continue to listen for other repetitions of the association request command during other association S-CAPs in order to find better transmit quasi-omni direction of the DEV.

Once the association response command or the 1 mm-ACK message is received successfully at the DEV, the DEV may cease the transmission of repetitions of the association request command and ignore other copies of the same association response command from the PNC.

The DEV may use the regular S-CAP of the PNC quasi-omni receive direction carried in the association response command for all further CAP transactions with the PNC before the completion of the preferred antenna direction pair searching. In addition, the DEV may use its transmit quasi-omni direction carried in the association response command before the completion of the preferred antenna direction pair searching.

Quasi-Omni Transmit Direction Training and Tracking

Figure 9:
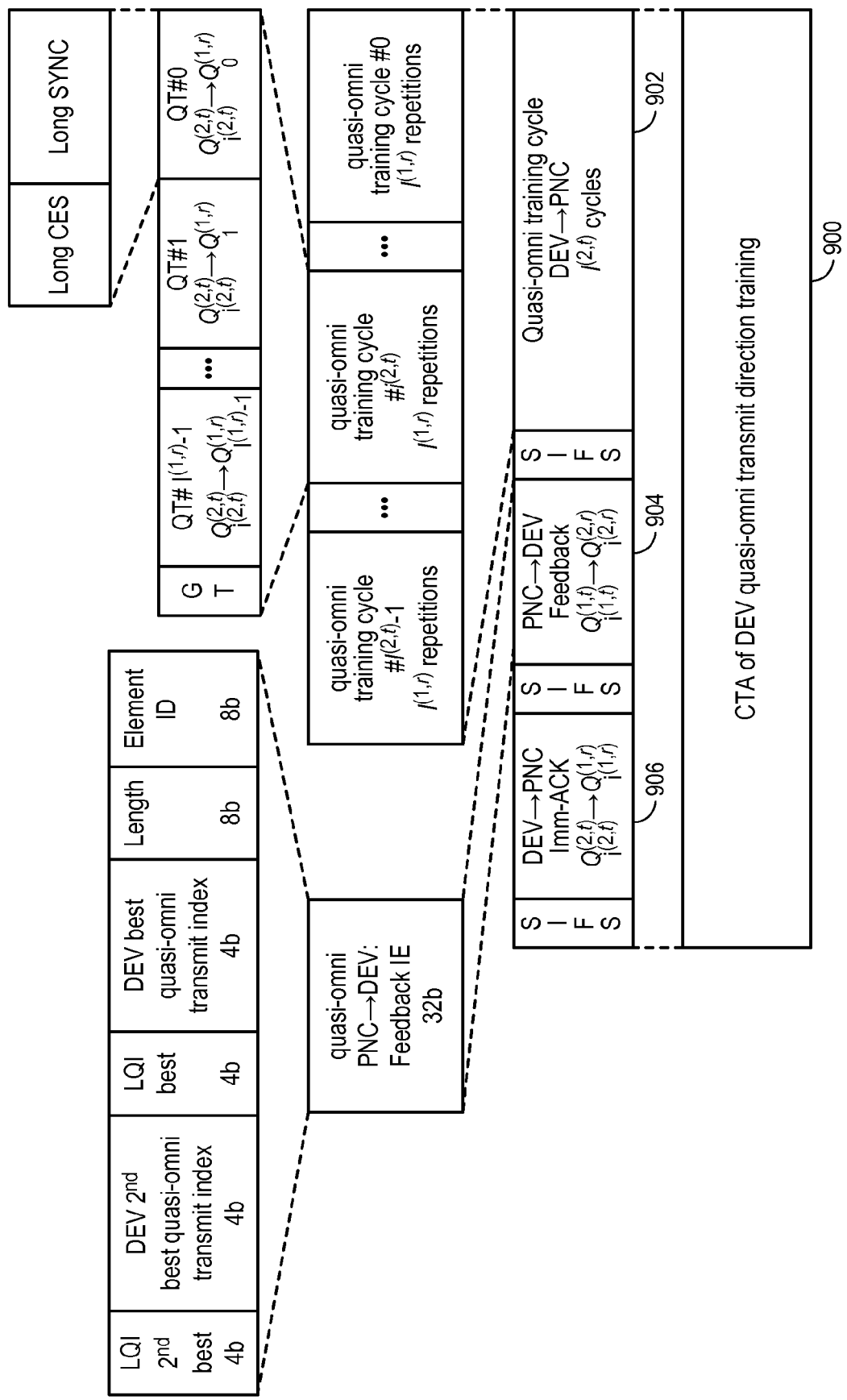
FIG. 9 illustrates a channel time allocation (CTA) structure for quasi-omni transmit direction training in accordance with certain aspects of the present disclosure.
Figure 10:
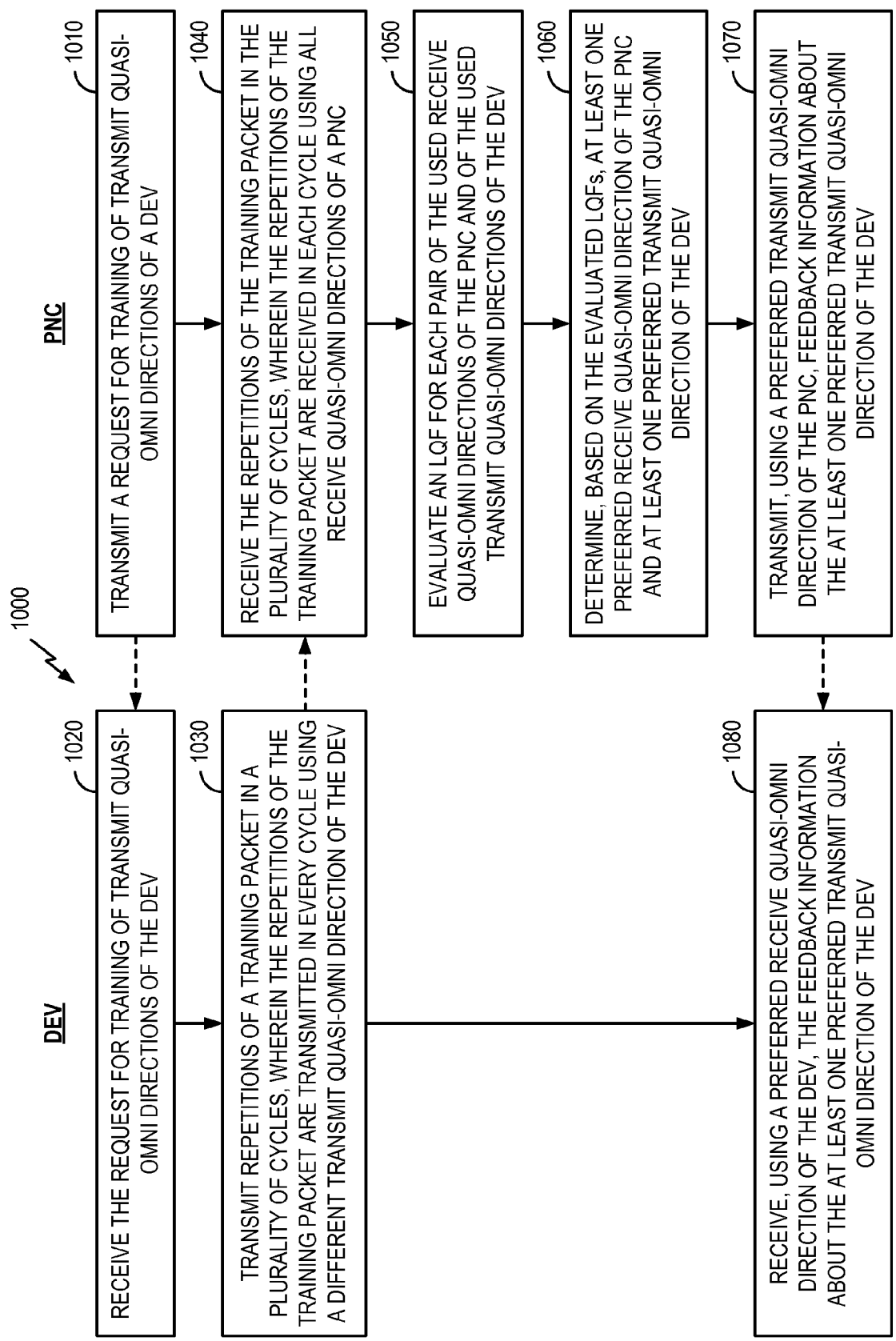
FIG. 10 illustrates example operations for multi-cycle training in CTA periods in accordance with certain aspects of the present disclosure.

Since the antenna direction pair found at the association stage may not be the preferred pair due to possible collisions in a contention access period (CAP) and moving of a DEV, the PNC may send a request and reserve a channel time allocation (CTA) to search for the preferred and the second preferred antenna direction pairs when channel has free time. The CTA structure 900 for quasi-omni transmit direction training at a DEV is illustrated in FIG. 9. FIG. 10 illustrates example operations 1000 for multi-cycle training in CTA periods in accordance with certain aspects of the present disclosure.

At 1010, the PNC may transmit the request for training of transmit quasi-omni directions of the DEV, wherein the training will be performed in the CTA period. The request for training may be successfully received at the DEV, at 1020. The quasi-omni training 902 may consist of $I^{(2,t)}$ cycles, as illustrated in FIG. 9. During each cycle, the DEV may send, at 1030, $I^{(2,t)}$ repetitions of a quasi-omni training (QT) sequence in the same direction. The $I^{(2,t)}$ cycles may be sent in $I^{(2,t)}$ different quasi-omni directions of the DEV, namely $\lfloor Q_0^{(1,r)}, Q_1^{(1,r)}, \ldots, Q_{I^{(2,t)}-1}^{(2,t)} \rfloor$.

During a cycle, the PNC may attempt to receive each of the $I^{(1,r)}$ quasi-omni training sequences using a different receive direction, at 1040. The $I^{(1,r)}$ different directions $\lfloor Q_0^{(1,r)}, Q_1^{(1,r)}, \ldots, Q_{I^{(1,r)}-1}^{(1,r)} \rfloor$ during a cycle may correspond to the PNC quasi-omni receive directions.

At the completion of the full $I^{(2,t)}$ cycles, the PNC had an opportunity to receive the QT sequence using each combination of the DEV transmit quasi-omni direction (i.e., from 0 to $I^{(2,t)}-1$ and of the PNC receive quasi-omni direction (i.e., from 0 to $I^{(1,r)}-1$). At 1050, the PNC may evaluate LQFs for each pair of quasi-omni directions used at the DEV and at the PNC. Based on the evaluated LQFs, the PNC may select, at 1060, the preferred quasi-omni pair, i.e., the DEV's preferred transmit quasi-omni direction $I_{i^{(2,t)}}^{(2,t)}$, and the PNC preferred receive quasi-omni direction $I_{i^{(1,r)}}^{(1,r)}$.

Following the quasi-omni training, the PNC may transmit, at 1070, its quasi-omni feedback in a Feedback IE 904 by sending an announce command with a request for an 1 mm-ACK message. The announce command may be sent from the PNC in the preferred transmit quasi-omni direction $Q_{i^{(1,t)}}^{(1,t)}$, and the DEV may listen and receive the feedback information on its preferred receive direction $Q_{i^{(2,r)}}^{(2,r)}$, at 1080. The feedback IE may inform the DEV of its preferred transmit quasi-omni direction $Q_{i^{(2,t)}}^{(2,t)}$, second preferred quasi-omni direction, and the corresponding LQIs. After successful reception of the announce command, the DEV may send the 1 mm-ACK message 906 to the PNC using the preferred transmit direction of the DEV.

Figure 11:
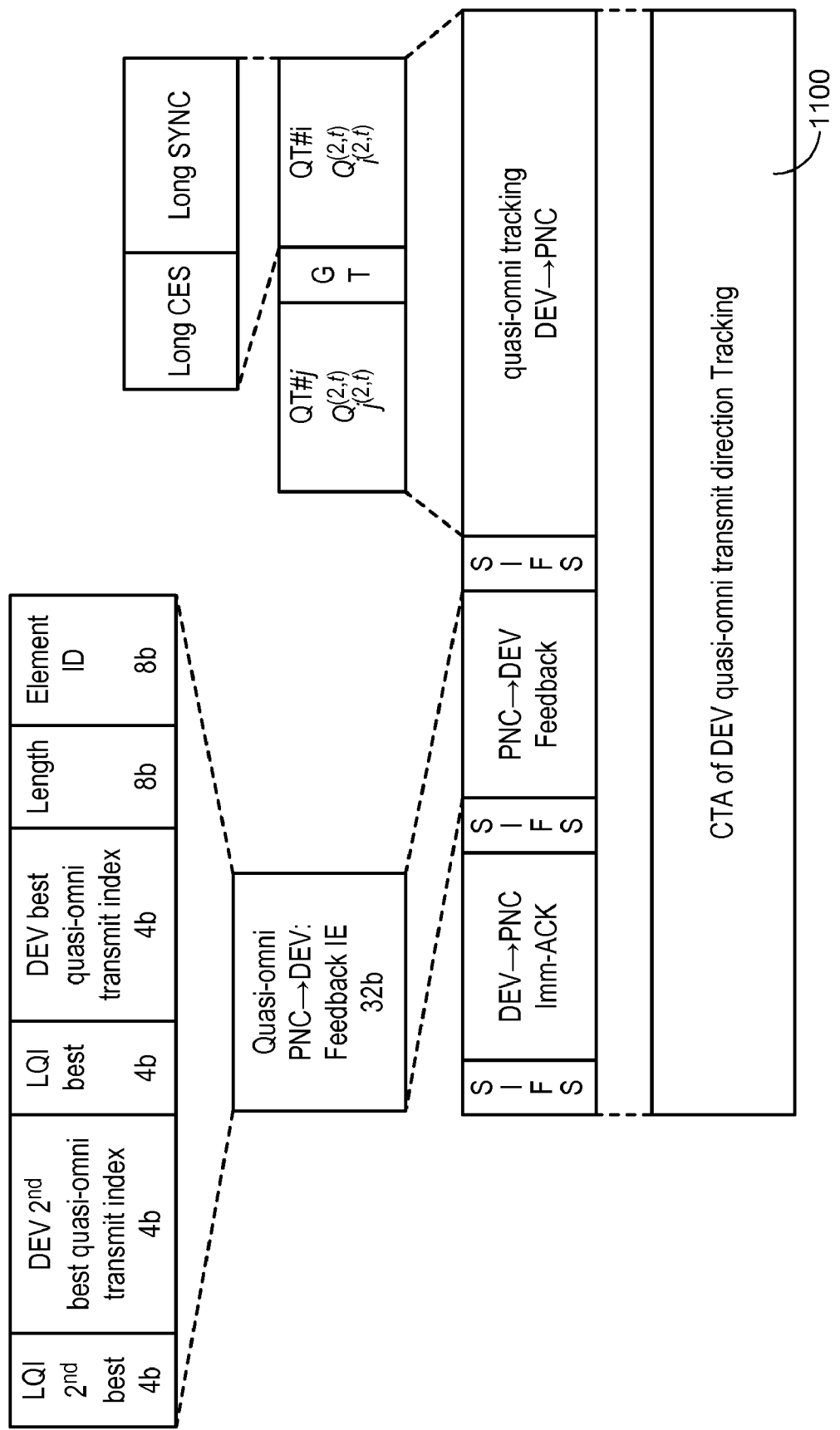
FIG. 11 illustrates a CTA structure for quasi-omni transmit direction tracking in accordance with certain aspects of the present disclosure.

The PNC may track the preferred and second preferred antenna direction pairs based on LQI measurement by allocating a tracking CTA periodically when channel has free time. The CTA structure 1100 for DEV quasi-omni transmit direction tracking is illustrated in FIG. 11. If the signal quality in the second preferred pair is better than the preferred pair, the PNC and the DEV may switch to the second preferred pair, which may become the new preferred antenna direction pair.

Figure 8A:
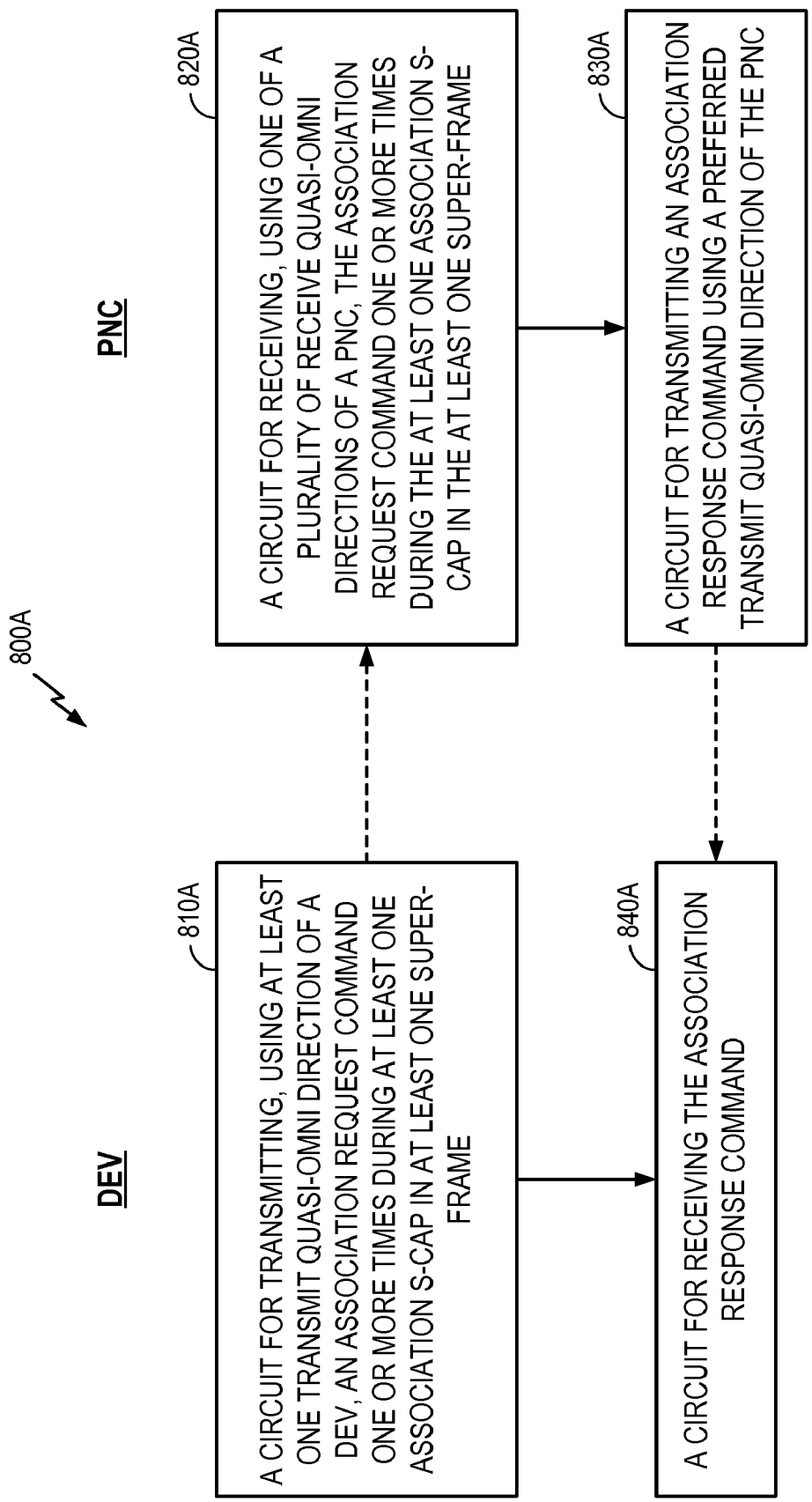
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 810-840 and 1010-1080, illustrated in FIGS. 8 and 10 correspond to circuit blocks 810A-840A and 1010A-1080A illustrated in FIGS. 8A and 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, an access terminal or other type of wireless device with processing logic and elements to perform the techniques provided herein.

The invention claimed is:

1. A method for wireless communications, comprising:
   transmitting, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame; and
   receiving, at the device, an association response command transmitted from the PNC.

2. The method of claim 1, wherein the transmission comprises transmitting the association request command at least two times during an association S-CAP of the at least one association S-CAP, wherein the association request command is transmitted, each time, by using a different transmit quasi-omni direction of the device from the at least one transmit quasi-omni direction.

3. The method of claim 2, wherein each of the transmitted association request command is associated with a counter indicating how many transmissions of the association request command are remaining during the association S-CAP.

4. The method of claim 2, wherein the transmission comprises transmitting the association request command using a set of transmit quasi-omni directions of the device, wherein each association request command is transmitted in a different quasi-omni transmit direction of the device, and wherein the set of transmit quasi-omni directions comprises all transmit quasi-omni directions of the device.

5. The method of claim 1, wherein the transmission comprises transmitting the association request command one time during an association S-CAP of the at least one association S-CAP using a transmit quasi-omni direction chosen from the at least one transmit quasi-omni direction of the device, and the method further comprising:
   listening, at the device, for the association response command during an immediate acknowledgement period of a super-frame of the at least one super-frame.

6. The method of claim 5, further comprising:
   transmitting the association request command one time during another association S-CAP of the at least one association S-CAP using another transmit quasi-omni direction chosen from the at least one transmit quasi-omni direction of the device, if the device has not received the association response command during the immediate acknowledgement period.

7. The method of claim 6, wherein a number of association S-CAPs of the at least one association S-CAP in the super-frame is equal to a number of different receive quasi-omni directions of the PNC.

8. The method of claim 1, further comprising:
   ceasing, at the device, the transmission of the association request command, if the association response command is received at the device; and
   ignoring, at the device, reception of copies of the same association response command.

9. The method of claim 1, wherein the association response command received at the device comprises information about a preferred transmit quasi-omni direction of the device chosen from the at least one transmit quasi-omni direction and information about a preferred receive quasi-omni direction of the PNC, wherein the preferred transmit quasi-omni direction of the device is direction from which the received association request command was transmitted from the device, and wherein the preferred receive quasi-omni direction of the PNC is direction used to receive the association request command.

10. The method of claim 9, further comprising:
    performing contention access period (CAP) transactions with the PNC in a regular S-CAP that will be received at the PNC using the preferred receive quasi-omni direction of the PNC in each super-frame until a new preferred receive quasi-omni direction of the PNC is determined.

11. The method of claim 9, further comprising:
    communicating with the PNC using the preferred transmit quasi-omni direction of the device.

12. The method of claim 1, wherein the each transmitted association request command comprises information about a preferred transmit quasi-omni direction of the PNC, wherein the preferred transmit quasi-omni direction of the PNC is direction from which the PNC will transmit an association response command back to the device.

13. An apparatus for wireless communications, comprising:
    a transmitter configured to transmit an association request command one or more times during at least one association sub contention access period (S-CAP) in at least one super-frame using at least one transmit quasi-omni direction of the apparatus, wherein a piconet controller (PNC) is set for reception on different receive quasi-omni direction during each association S-CAP in a super-frame of the at least one super-frame; and
    a receiver configured to receive an association response command transmitted from the PNC.

14. The apparatus of claim 13, wherein the transmitter configured to transmit comprises a circuit configured to transmit the association request command at least two times during an association S-CAP of the at least one association S-CAP, wherein the association request command is transmitted, each time, by using a different transmit quasi-omni direction of the apparatus from the at least one transmit quasi-omni direction.

15. The apparatus of claim 14, wherein each of the transmitted association request command is associated with a counter indicating how many transmissions of the association request command are remaining during the association S-CAP.

16. The apparatus of claim 14, wherein the transmitter configured to transmit comprises a circuit configured to transmit the association request command using a set of transmit quasi-omni directions of the apparatus, wherein each association request command is transmitted in a different quasi-omni transmit direction of the apparatus, and wherein the set of transmit quasi-omni directions comprises all transmit quasi-omni directions of the apparatus.

17. The apparatus of claim 13, wherein the transmitter configured to transmit comprises a circuit configured to transmit the association request command one time during an association S-CAP of the at least one association S-CAP using a transmit quasi-omni direction chosen from the at least one transmit quasi-omni direction of the apparatus, and the apparatus further comprising:
a circuit configured to listen for the association response command during an immediate acknowledgement period of a super-frame of the at least one super-frame.

18. The apparatus of claim 17, further comprising:
a circuit configured to transmit the association request command one time during another association S-CAP of the at least one association S-CAP using another transmit quasi-omni direction chosen from the at least one transmit quasi-omni direction of the apparatus, if the apparatus has not received the association response command during the immediate acknowledgement period.

19. The apparatus of claim 18, wherein a number of association S-CAPs of the at least one association S-CAP in the super-frame is equal to a number of different receive quasi-omni directions of the PNC.

20. The apparatus of claim 13, further comprising:
a first circuit configured to cease the transmission of the association request command, if the association response command is received at the apparatus; and
a second circuit configured to ignore reception of copies of the same association response command.

21. The apparatus of claim 13, wherein the association response command received at the apparatus comprises information about a preferred transmit quasi-omni direction of the apparatus chosen from the at least one transmit quasi-omni direction and information about a preferred receive quasi-omni direction of the PNC, wherein the preferred transmit quasi-omni direction of the apparatus is direction from which the received association request command was transmitted from the apparatus, and wherein the preferred receive quasi-omni direction of the PNC is direction used to receive the association request command.

22. The apparatus of claim 21, further comprising:
a circuit configured to perform contention access period (CAP) transactions with the PNC in a regular S-CAP that will be received at the PNC using the preferred receive quasi-omni direction of the PNC in each super-frame until a new preferred receive quasi-omni direction of the PNC is determined.

23. The apparatus of claim 21, further comprising:
a circuit configured to communicate with the PNC using the preferred transmit quasi-omni direction of the apparatus.

24. The apparatus of claim 13, wherein the each transmitted association request command comprises information about a preferred transmit quasi-omni direction of the PNC, wherein the preferred transmit quasi-omni direction of the PNC is direction from which the PNC will transmit an association response command back to the apparatus.

25. An apparatus for wireless communications, comprising:
means for transmitting an association request command one or more times during at least one association sub contention access period (S-CAP) in at least one super-frame using at least one transmit quasi-omni direction of the apparatus, wherein a piconet controller (PNC) is set for reception on different receive quasi-omni direction during each association S-CAP in a super-frame of the at least one super-frame; and
means for receiving an association response command transmitted from the PNC.

26. The apparatus of claim 25, wherein the means for transmitting comprises means for transmitting the association request command at least two times during an association S-CAP of the at least one association S-CAP, wherein the association request command is transmitted, each time, by using a different transmit quasi-omni direction of the apparatus from the at least one transmit quasi-omni direction.

27. The apparatus of claim 26, wherein each of the transmitted association request command is associated with a counter indicating how many transmissions of the association request command are remaining during the association S-CAP.

28. The apparatus of claim 26, wherein the means for transmitting comprises means for transmitting the association request command using a set of transmit quasi-omni directions of the apparatus, wherein each association request command is transmitted in a different quasi-omni transmit direction of the apparatus, and wherein the set of transmit quasi-omni directions comprises all transmit quasi-omni directions of the apparatus.

29. The apparatus of claim 25, wherein the means for transmitting comprises means for transmitting the association request command one time during an association S-CAP of the at least one association S-CAP using a transmit quasi-omni direction chosen from the at least one transmit quasi-omni direction of the apparatus, and the apparatus further comprising:
means for listening for the association response command during an immediate acknowledgement period of a super-frame of the at least one super-frame.

30. The apparatus of claim 29, further comprising:
means for transmitting the association request command one time during another association S-CAP of the at least one association S-CAP using another transmit quasi-omni direction chosen from the at least one transmit quasi-omni direction of the apparatus, if the apparatus has not received the association response command during the immediate acknowledgement period.

31. The apparatus of claim 30, wherein a number of association S-CAPs of the at least one association S-CAP in the super-frame is equal to a number of different receive quasi-omni directions of the PNC.

32. The apparatus of claim 25, further comprising:
- means for ceasing the transmission of the association request command, if the association response command is received at the apparatus; and
- means for ignoring reception of copies of the same association response command.

33. The apparatus of claim 25, wherein the association response command received at the apparatus comprises information about a preferred transmit quasi-omni direction of the apparatus chosen from the at least one transmit quasi-omni direction and information about a preferred receive quasi-omni direction of the PNC, wherein the preferred transmit quasi-omni direction of the apparatus is direction from which the received association request command was transmitted from the apparatus, and wherein the preferred receive quasi-omni direction of the PNC is direction used to receive the association request command.

34. The apparatus of claim 33, further comprising:
- means for performing contention access period (CAP) transactions with the PNC in a regular S-CAP that will be received at the PNC using the preferred receive quasi-omni direction of the PNC in each super-frame until a new preferred receive quasi-omni direction of the PNC is determined.

35. The apparatus of claim 33, further comprising:
- means for communicating with the PNC using the preferred transmit quasi-omni direction of the apparatus.

36. The apparatus of claim 25, wherein the each transmitted association request command comprises information about a preferred transmit quasi-omni direction of the PNC, wherein the preferred transmit quasi-omni direction of the PNC is direction from which the PNC will transmit an association response command back to the apparatus.

37. A computer-program product for wireless communications, comprising a computer-readable medium comprising instructions executable to:
- transmit, from a device, an association request command one or more times during at least one association sub contention access period (S-CAP) in at least one super-frame using at least one transmit quasi-omni direction of the device, wherein a piconet controller (PNC) is set for reception on different receive quasi-omni direction during each association S-CAP in a super-frame of the at least one super-frame; and
- receive, at the device, an association response command transmitted from the PNC.

38. An access terminal, comprising:
- at least one antenna;
- a transmitter configured to transmit, from the access terminal via the at least one antenna, an association request command one or more times during at least one association sub contention access period (S-CAP) in at least one super-frame using at least one transmit quasi-omni direction of the access terminal, wherein an access point is set for reception on different receive quasi-omni direction during each association S-CAP in a super-frame of the at least one super-frame; and
- a receiver configured to receive, at the access terminal via the at least one antenna, an association response command transmitted from the access terminal.

39. A method for wireless communications, comprising:
- receiving, at a piconet controller (PNC), an association request command one or more times during an association sub contention access period (S-CAP), wherein:
- one of a plurality of receive quasi-omni directions of the PNC is used for the reception,
- the association request command is transmitted from a device during at least one association S-CAP in at least one super-frame, and
- the PNC is set for reception on different receive quasi-omni direction during each association S-CAP in a super-frame of the at least one super-frame; and
- transmitting, from the PNC, an association response command to the device using a preferred transmit quasi-omni direction of the PNC, wherein information about the preferred transmit quasi-omni direction is included in the received association request command.

40. The method of claim 39, wherein the reception comprises receiving at least two copies of the association request command during an association S-CAP of the at least one association S-CAP, wherein each received copy of the association request command was transmitted from the device using a different transmit quasi-omni direction selected from the at least one transmit quasi-omni direction of the device.

41. The method of claim 40, further comprising:
- decoding, at the PNC, each of the at least two copies of the association request command received during the association S-CAP;
- evaluating a link quality factor (LQF) of the each received copy of the association request command; and
- determining a preferred transmit quasi-omni direction of the device as a direction with the largest LQF among the evaluated LQFs.

42. The method of claim 41, wherein the association response command comprises information about the preferred transmit quasi-omni direction of the device.

43. The method of claim 42, wherein the association response command comprises information about a preferred receive quasi-omni direction of the PNC, wherein the preferred receive quasi-omni direction is direction used to receive the at least two copies of the association request command at the PNC.

44. The method of claim 41, wherein the LQF comprises at least one of following: a signal-to-noise ratio (SNR), a signal-to-noise plus interference ratio (SNIR), a bit error rate (BER), and a receive signal strength indicator (RSSI).

45. The method of claim 39, wherein a number of association S-CAPs of the at least one association S-CAP in the super-frame is equal to a number of different receive quasi-omni directions of the PNC.

46. The method of claim 45, wherein the reception comprises receiving the association request command one time during an association S-CAP of the at least one association S-CAP.

47. The method of claim 46, wherein that one association request command was transmitted from the device using a transmit quasi-omni direction of the device that is different than a direction used for transmitting a copy of the association request command during another association S-CAP of the at least one association S-CAP.

48. The method of claim 46, further comprising:
- decoding, at the PNC, the received one association request command to obtain information indicating a direction from which the received one association request command was transmitted from the device; and
- determining a preferred transmit quasi-omni direction of the device as the direction from which the received one association request command was transmitted from the device.

49. The method of claim 48, wherein the association response command comprises information about the preferred transmit quasi-omni direction of the device.

50. The method of claim 49, wherein the association response command comprises information about a preferred receive quasi-omni direction of the PNC, wherein the preferred receive quasi-omni direction is direction used to receive the association request command at the PNC.

51. The method of claim 50, further comprising:
communicating with the device using the preferred receive quasi-omni direction of the PNC.

52. An apparatus for wireless communications, comprising:
a receiver configured to receive an association request command one or more times during an association sub contention access period (S-CAP), wherein:
one of a plurality of receive quasi-omni directions of the apparatus is used for the reception,
the association request command is transmitted from another apparatus during at least one association S-CAP in at least one super-frame, and
the apparatus is set for reception on different receive quasi-omni direction during each association S-CAP in a super-frame of the at least one super-frame; and
a transmitter configured to transmit an association response command to the other apparatus using a preferred transmit quasi-omni direction of the apparatus, wherein information about the preferred transmit quasi-omni direction is included in the received association request command.

53. The apparatus of claim 52, wherein the receiver configured to receive comprises a circuit configured to receive at least two copies of the association request command during an association S-CAP of the at least one association S-CAP, wherein each received copy of the association request command was transmitted from the other apparatus using a different transmit quasi-omni direction selected from the at least one transmit quasi-omni direction of the other apparatus.

54. The apparatus of claim 53, further comprising:
a decoder configured to decode each of the at least two copies of the association request command received during the association S-CAP;
an evaluating circuit configured to evaluate a link quality factor (LQF) of the each received copy of the association request command; and
a circuit configured to determine a preferred transmit quasi-omni direction of the other apparatus as a direction with the largest LQF among the evaluated LQFs.

55. The apparatus of claim 54, wherein the association response command comprises information about the preferred transmit quasi-omni direction of the other apparatus.

56. The apparatus of claim 55, wherein the association response command comprises information about a preferred receive quasi-omni direction of the apparatus, wherein the preferred receive quasi-omni direction is direction used to receive the at least two copies of the association request command at the apparatus.

57. The apparatus of claim 54, wherein the LQF comprises at least one of following: a signal-to-noise ratio (SNR), a signal-to-noise plus interference ratio (SNIR), a bit error rate (BER), and a receive signal strength indicator (RSSI).

58. The apparatus of claim 52, wherein a number of association S-CAPs of the at least one association S-CAP in the super-frame is equal to a number of different receive quasi-omni directions of the apparatus.

59. The apparatus of claim 58, wherein the receiver configured to receive comprises a circuit configured to receive the association request command one time during an association S-CAP of the at least one association S-CAP.

60. The apparatus of claim 59, wherein that one association request command was transmitted from the other apparatus using a transmit quasi-omni direction of the other apparatus that is different than a direction used for transmitting a copy of the association request command during another association S-CAP of the at least one association S-CAP.

61. The apparatus of claim 59, further comprising:
a decoder configured to decode the received one association request command to obtain information indicating a direction from which the received one association request command was transmitted from the other apparatus; and
a circuit configured to determine a preferred transmit quasi-omni direction of the other apparatus as the direction from which the received one association request command was transmitted from the other apparatus.

62. The apparatus of claim 61, wherein the association response command comprises information about the preferred transmit quasi-omni direction of the other apparatus.

63. The apparatus of claim 62, wherein the association response command comprises information about a preferred receive quasi-omni direction of the apparatus, wherein the preferred receive quasi-omni direction is direction used to receive the association request command at the apparatus.

64. The apparatus of claim 63, further comprising:
a circuit configured to communicate with the other apparatus using the preferred receive quasi-omni direction of the apparatus.

65. An apparatus for wireless communications, comprising:
means for receiving an association request command one or more times during an association sub contention access period (S-CAP), wherein:
one of a plurality of receive quasi-omni directions of the apparatus is used for the reception,
the association request command is transmitted from another apparatus during at least one association S-CAP in at least one super-frame, and
the apparatus is set for reception on different receive quasi-omni direction during each association S-CAP in a super-frame of the at least one super-frame; and
means for transmitting an association response command to the other apparatus using a preferred transmit quasi-omni direction of the apparatus, wherein information about the preferred transmit quasi-omni direction is included in the received association request command.

66. The apparatus of claim 65, wherein the means for receiving comprises means for receiving at least two copies of the association request command during an association S-CAP of the at least one association S-CAP, wherein each received copy of the association request command was transmitted from the other apparatus using a different transmit quasi-omni direction selected from the at least one transmit quasi-omni direction of the other apparatus.

67. The apparatus of claim 66, further comprising:
means for decoding each of the at least two copies of the association request command received during the association S-CAP;
means for evaluating a link quality factor (LQF) of the each received copy of the association request command; and
means for determining a preferred transmit quasi-omni direction of the other apparatus as a direction with the largest LQF among the evaluated LQFs.

68. The apparatus of claim 67, wherein the association response command comprises information about the preferred transmit quasi-omni direction of the other apparatus.

69. The apparatus of claim 68, wherein the association response command comprises information about a preferred receive quasi-omni direction of the apparatus, wherein the preferred receive quasi-omni direction is direction used to receive the at least two copies of the association request command at the apparatus.

70. The apparatus of claim 67, wherein the LQF comprises at least one of following: a signal-to-noise ratio (SNR), a signal-to-noise plus interference ratio (SNIR), a bit error rate (BER), and a receive signal strength indicator (RSSI).

71. The apparatus of claim 65, wherein a number of association S-CAPs of the at least one association S-CAP in the super-frame is equal to a number of different receive quasi-omni directions of the apparatus.

72. The apparatus of claim 71, wherein the means for receiving comprises means for receiving the association request command one time during an association S-CAP of the at least one association S-CAP.

73. The apparatus of claim 72, wherein that one association request command was transmitted from the other apparatus using a transmit quasi-omni direction of the other apparatus that is different than a direction used for transmitting a copy of the association request command during another association S-CAP of the at least one association S-CAP.

74. The apparatus of claim 72, further comprising:
means for decoding the received one association request command to obtain information indicating a direction from which the received one association request command was transmitted from the other apparatus; and
means for determining a preferred transmit quasi-omni direction of the other apparatus as the direction from which the received one association request command was transmitted from the other apparatus.

75. The apparatus of claim 74, wherein the association response command comprises information about the preferred transmit quasi-omni direction of the other apparatus.

76. The apparatus of claim 75, wherein the association response command comprises information about a preferred receive quasi-omni direction of the apparatus, wherein the preferred receive quasi-omni direction is direction used to receive the association request command at the apparatus.

77. The apparatus of claim 76, further comprising:
means for communicating with the other apparatus using the preferred receive quasi-omni direction of the apparatus.

78. A computer-program product for wireless communications, comprising a computer-readable medium comprising instructions executable to:
receive, at a piconet controller (PNC), an association request command one or more times during an association sub contention access period (S-CAP), wherein:
one of a plurality of receive quasi-omni directions of the PNC is used for the reception,
the association request command is transmitted from a device during at least one association S-CAP in at least one super-frame, and
the PNC is set for reception on different receive quasi-omni direction during each association S-CAP in a super-frame of the at least one super-frame; and
transmit, from the PNC, an association response command to the device using a preferred transmit quasi-omni direction of the PNC, wherein information about the preferred transmit quasi-omni direction is included in the received association request command.

79. An access point, comprising:
at least one antenna;
a receiver configured to receive, at the access point via the at least one antenna, an association request command one or more times during an association sub contention access period (S-CAP), wherein:
one of a plurality of receive quasi-omni directions of the access point is used for the reception,
the association request command is transmitted from an access terminal during at least one association S-CAP in at least one super-frame, and
the access point is set for reception on different receive quasi-omni direction during each association S-CAP in a super-frame of the at least one super-frame; and
a transmitter configured to transmit, from the access point via the at least one antenna, an association response command to the access terminal using a preferred transmit quasi-omni direction of the access point, wherein information about the preferred transmit quasi-omni direction is included in the received association request command.

* * * * *